United States Patent
Krenz et al.

(10) Patent No.: US 10,395,448 B2
(45) Date of Patent: Aug. 27, 2019

(54) REMOTE DATA CAPTURE AND MANAGEMENT SYSTEMS

(71) Applicant: Hamilton Sundstrand Corporation, Charlotte, NC (US)

(72) Inventors: Michael Krenz, Roscoe, IL (US); Kurt L. Kittleson, Byron, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 134 days.

(21) Appl. No.: 15/227,043

(22) Filed: Aug. 3, 2016

(65) Prior Publication Data

US 2018/0037337 A1   Feb. 8, 2018

(51) Int. Cl.
*G07C 5/08* (2006.01)
*G07C 5/00* (2006.01)
*B64F 5/60* (2017.01)

(52) U.S. Cl.
CPC ............... *G07C 5/085* (2013.01); *B64F 5/60* (2017.01); *G07C 5/008* (2013.01); *G07C 5/0808* (2013.01)

(58) Field of Classification Search
CPC ..... B64F 5/0045; G07C 5/085; G07C 5/0808; G07C 5/008; H04L 41/069; G08G 5/0013; H04W 4/027; G05B 23/0264; B60C 2200/02; G06F 8/10; G06F 8/35; G06F 8/30; G06F 8/34
See application file for complete search history.

(56) References Cited

U.S. PATENT DOCUMENTS

| | | | |
|---|---|---|---|
| 5,838,261 A * | 11/1998 | Lauta | G05B 23/0272 340/945 |
| 7,013,210 B2 | 3/2006 | McBrien et al. | |
| 8,028,269 B2 | 9/2011 | Bhatia et al. | |
| 8,054,331 B2 | 11/2011 | Ivers | |
| 9,063,800 B2 | 6/2015 | McCready | |
| 9,213,626 B2 | 12/2015 | Dickey et al. | |
| 2005/0148327 A1* | 7/2005 | Perez | G07C 5/008 455/431 |

(Continued)

FOREIGN PATENT DOCUMENTS

WO   WO-2009/103387 A1   8/2009

*Primary Examiner* — Stephen Holwerda
(74) *Attorney, Agent, or Firm* — Locke Lord LLP; Daniel J. Fiorello; Scott D. Wofsy

(57) ABSTRACT

A computer implemented method for managing data of a remote system includes receiving, at a processor on the remote system, fundamental data from a monitored subsystem of the remote system and/or at least one associated subsystem of the remote system as specified by a diagnostic protocol for the monitored subsystem and wirelessly transmitting the fundamental data to a remote support center that is separate from the remote system. The remote system applies additional, non-certified, logic to determine if augmented diagnostic data is desired. The method also includes wirelessly receiving a signal from the remote support center including at least one of a request for augmented data or a diagnostic protocol change command. The method also includes receiving the augmented data from the monitored subsystem and/or the at least one associated subsystem and/or at least one other subsystem of the remote system, and transmitting the augmented data to the remote support center.

19 Claims, 1 Drawing Sheet

(56) References Cited

U.S. PATENT DOCUMENTS

| | | | |
|---|---|---|---|
| 2009/0030563 A1* | 1/2009 | Beacham, Jr. | G07C 5/008 |
| | | | 701/3 |
| 2009/0051510 A1* | 2/2009 | Follmer | G07C 5/008 |
| | | | 340/425.5 |
| 2010/0023201 A1* | 1/2010 | Kinney | G05B 23/0264 |
| | | | 701/31.4 |
| 2011/0283070 A1 | 11/2011 | Rischar et al. | |
| 2013/0019224 A1* | 1/2013 | Madl | G06F 8/10 |
| | | | 717/104 |
| 2015/0347127 A1 | 12/2015 | Leibham et al. | |

* cited by examiner

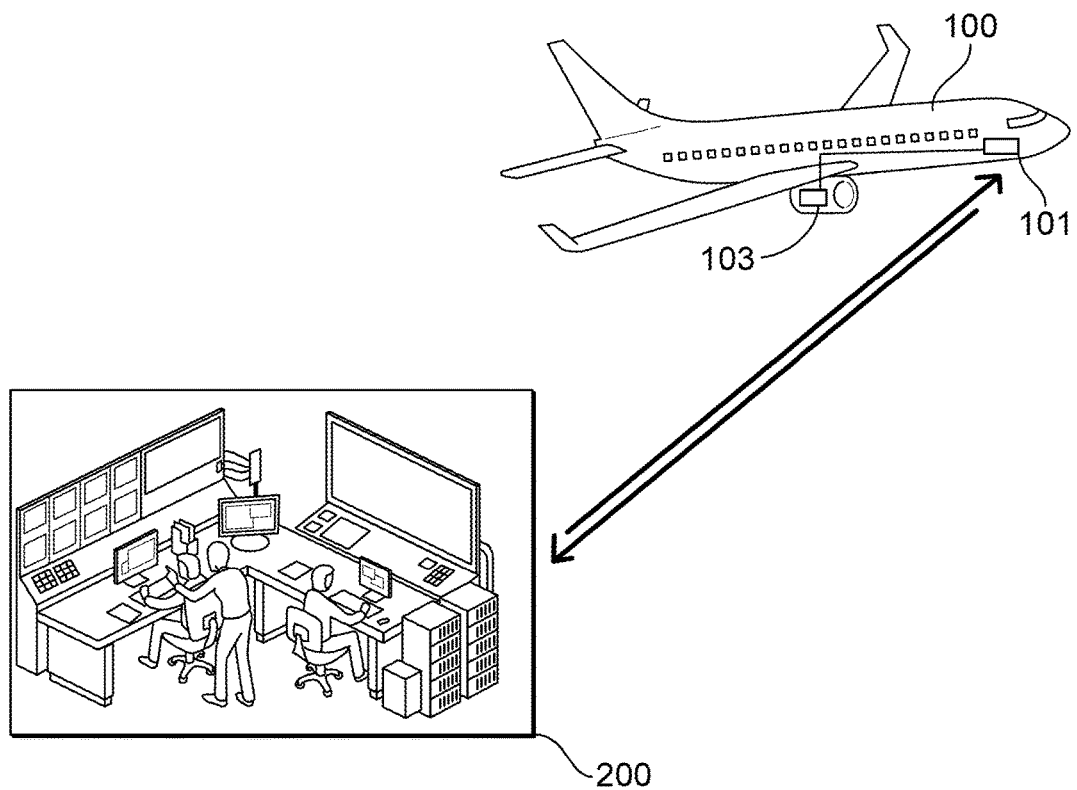

REMOTE DATA CAPTURE AND MANAGEMENT SYSTEMS

BACKGROUND

1. Field

The present disclosure relates to remote systems (e.g., aircraft or other vehicles), more specifically to data capture and management systems for remote systems.

2. Description of Related Art

Modern aircraft systems, for example, perform diagnostic tests on every aspect of their operation, often at very high periodic rates. The amount of data gathered far exceeds the capacity to either store all of the data locally or to communicate the data elsewhere onboard the aircraft or off of the aircraft even though only a subset of the captured information may be of interest.

Such conventional methods and systems have generally been considered satisfactory for their intended purpose. However, there is still a need in the art for improved aircraft data capture and management systems in safety critical applications where wholesale modification of application diagnostics software is not practical due to certification considerations. The present disclosure provides a solution for this need.

SUMMARY

A computer implemented method for managing data of a remote system includes receiving, at a processor on the remote system, fundamental data from at least one of a monitored subsystem of the remote system or at least one associated subsystem of the remote system as specified by a diagnostic protocol for the monitored subsystem and wirelessly transmitting the fundamental data to a remote support center that is separate from the remote system. The method also includes wirelessly receiving a signal from the remote support center including at least one of a request for augmented data or a diagnostic protocol change command, wherein if the signal includes a request for augmented data, causing the monitored subsystem and/or the at least one associated subsystem and/or at least one other subsystem of the remote system to output augmented data based on the request for augmented data, wherein, if the signal includes a diagnostic protocol change command, modifying the diagnostic protocol based on the diagnostic protocol change command to modify a content or a format of the fundamental data. The method also includes receiving the augmented data from the monitored subsystem and/or the at least one associated subsystem and/or at least one other subsystem of the remote system, and transmitting the augmented data to the remote support center.

Modifying the diagnostic protocol can include modifying a stack/table logic that defines the diagnostic protocol. In certain embodiments, modifying the diagnostic protocol can include modifying which subsystems of the remote system that data is output from with the fundamental data.

In certain embodiments, modifying the diagnostic protocol can include modifying a sample rate. Modifying the diagnostic protocol can include modifying a sample time length. Causing the output of augmented data includes modifying a data sample rate.

The remote system can be an aircraft, for example. In certain embodiments, the remote support center is a ground based support center.

A computer implemented method for managing data of a remote system can include wirelessly receiving, at a processor of a remote data center and from a remote system, a fundamental data from a monitored subsystem of the remote system and/or at least one associated subsystem of the remote system as specified by a diagnostic protocol for the monitored subsystem, determining if augmented data or a diagnostic protocol change is desired based upon the fundamental data received, and wirelessly transmitting a signal from the remote support center including at least one of a request for augmented data or a diagnostic protocol change command. The method can further include receiving, from the remote system, the augmented data from the monitored subsystem and/or the at least one associated subsystem and/or at least one other subsystem of the remote system. In certain embodiments, the method can include utilizing non-certified software to process the fundamental data and/or the augmented data.

A non-transitory computer readable medium includes computer readable instructions for executing a method a described above.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic view of an embodiment of a system performing an embodiment of a method in accordance with this disclosure.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. The systems and methods described herein can be used to capture and manage data in a remote system (e.g., an aircraft).

With respect to certain data systems, U.S. Pat. No. 9,213,626, incorporated by reference herein, describes one or more embodiments of how to implement a dynamically controlled buffer storage mechanism for the capture of diagnostic information. U.S. Patent Application publication 2015/0347127, incorporated herein by reference, describes one or more embodiments of a stack/table driven logic engine. As appreciated by those having ordinary skill in the art, stack/table systems and operations allow quick verification that already approved systems will continue to always work without need for rigorous re-verification of codes. This allows modification (e.g., changes, additions, deletion) of logic equations.

Referring to FIG. 1, a remote system 100 is shown separate from remote support center 200. The remote system 100 can be an airplane, for example, or any other suitable system (e.g., any suitable vehicle, satellite, etc.). The remote supports center 200 can be a ground station, for example.

The remote system 100 can include a data module 101 including any suitable hardware and/or software for collecting, storing, and/or transmitting data to the remote support center 200. The data module 101 can be operatively connected to at least one monitored subsystem 103 (e.g., an engine, one or more portions of a landing gear system). The data module 101 can form one or more portions of a diagnostic system of the remote system 100, and/or can be operatively connected to one or more separate diagnostic systems of the remote system 100 to receive/transmit data therefrom/thereto (e.g., such that the data module 101 is connected to the monitored subsystem through the diagnostic system).

A computer implemented method for managing data of the remote system 100 can be performed by the data module 101, for example. The method includes receiving fundamental data from at least one of a monitored subsystem (e.g., subsystem 103) of the remote system 100 or at least one associated subsystem (relative to the monitored subsystem 103) of the remote system 100 as specified by a diagnostic protocol for the monitored subsystem 103. The fundamental data is data that is automatically collected according to the protocol in a certain condition (e.g., in an landing gear fault state, the diagnostic protocol can require collection of data from associated hydraulic systems and/or electrical systems). The diagnostic protocol can be predetermined and stored on the data module 101 and/or a separate diagnostic module that is operatively connected to the data module 101, for example.

The method includes wirelessly transmitting the fundamental data to the remote support center 200 that is separate from the remote system 100. The remote support center 200 can include far more complex, heavy, resource intensive computers and systems than those used on the remote system 100 for diagnostics, for example. In this regard, the remote support center 200 can receive the fundamental data from the remote system 100 and process the fundamental data differently and/or in more detail than is available on board the remote system 200. The remote support center 200 can then determine of more data and/or different data is desired and/or valuable for diagnosis, and send a signal to the remote system 100.

In this regard, the method also includes wirelessly receiving a signal from the remote support center 200 including at least one of a request for augmented data or a diagnostic protocol change command. If the signal includes a request for augmented data, then the monitored subsystem 103 and/or the at least one associated subsystem and/or at least one other subsystem of the remote system 100 is caused to output augmented data based on the request for augmented data. Causing the output of augmented data can include modifying a data sample rate, for example.

If the signal includes a diagnostic protocol change command, the diagnostic protocol can be modified based on the diagnostic protocol change command to modify the fundamental data (e.g., a content or a format thereof) that is output automatically/initially. Modifying the diagnostic protocol can include modifying a stack/table logic that defines the diagnostic protocol, for example.

In certain embodiments, modifying the diagnostic protocol can include modifying which subsystems 103 of the remote system 100 that data is output from with the fundamental data. In certain embodiments, modifying the diagnostic protocol can include modifying a sample rate. Modifying the diagnostic protocol can include modifying a sample time length. Any suitable modifications are contemplated herein.

The method can also include receiving the augmented data from the monitored subsystem 103 and/or the at least one associated subsystem and/or at least one other subsystem of the remote system 100. In certain embodiments, the method includes transmitting the augmented data to the remote support center 200, e.g., for further processing. The method can repeat indefinitely based on what data is desired from the support center 200.

An embodiment of a computer implemented method for managing data of a remote system can include wirelessly receiving, at a processor of a remote data center and from a remote system, a fundamental data from a monitored subsystem of the remote system and/or at least one associated subsystem of the remote system as specified by a diagnostic protocol for the monitored subsystem, determining if augmented data or a diagnostic protocol change is desired based upon the fundamental data received, and wirelessly transmitting a signal from the remote support center including at least one of a request for augmented data or a diagnostic protocol change command. The method can further include receiving, from the remote system, the augmented data from the monitored subsystem and/or the at least one associated subsystem and/or at least one other subsystem of the remote system. In certain embodiments, the method can include utilizing non-certified software to process the fundamental data and/or the augmented data.

A non-transitory computer readable medium includes computer readable instructions for executing any suitable embodiment of a method and/or any suitable portion(s) thereof as described above.

Embodiments allow the use of a support center 200 which can select when and how to pull data of certain systems on the remote system 100. In the case of aircraft, many systems cannot be modified without re-verification of code, however, stack/table logic systems allow modification without the need for re-verification, which can modify how on-board diagnostics works.

In the case of an aircraft, a ground support center has deeper more complicated diagnostic systems that need not be approved/verified since they are not on the aircraft. Using stack/table logic systems, for example, a more detailed logic can be executed to provide ground support for specific data of a subset system (e.g., a landing gear fault can cause the landing gear system to increase sampling rate and/or select certain data types) without affecting the certification basis, e.g., as described in U.S. Pat. No. 9,213,626.

For example, in the case of a fault in a monitored system, an initial fault can be detected and the above method can be executed. The initial fault along with any data specified by fundamental/baseline diagnostics system on airplane can be sent to the data module 101 which can then send this data to ground support center. The ground support center can then use this fundamental data (e.g., with the fault indication) to determine what is actually occurring in the aircraft and if more/other data is needed or would be helpful in further diagnosis. The ground support center can then send a modified request/logic change to airplane to cause it to provide more info (e.g., of a different/related system, such as hydraulic system data for a left main gear fault). The data module 101 can receive request/logic change, change what data is compiled, and sends this augmented data back to ground center. Both fundamental and augmented data can be sent together, or they can be independent of each other. This cycle can repeat as needed.

The trigger condition associated with the diagnostic data capture can be dynamically modified also using table/stack driven logic and configurable input/output tables. This enables the user to leverage the available processing capabilities and memory availability to the maximum extent possible in diagnosing specific issues that may vary from time to time and from target to target. That is, the user may wish to gather deeper information on System A, for example, than on System B, or the user may wish to gather different details about System A today versus tomorrow.

Table/Stack driven logic has also been used to implement control logic using only tables instead of software coding. This is valuable on safety critical systems where the validation/verification of compiled code can represent large risk and large costs to mitigate.

For cases where a sequence of events is desired, the "trigger" of one case can be used as an input term for the next case. For example, if the series of events was related to Ram Air Turbine deployment due to complete electrical failure, the first case trigger may be related to a generator tripping offline, which would then arm a second case trigger for the remaining generator tripping offline, which would then arm a trigger to monitor variables related to Ram Air Turbine deployment and functionality.

Any suitable embodiment of table/stack driven logic can be utilized to specify one or more trigger conditions. Each trigger condition further specifies data to be captured as previously disclosed, or in the new following manner:

Data_element, Sampling_rate, Sample_Start, Sample_End, where Data_element identifies a particular atomic piece of information to record, Sampling_rate is the frequency by which to sample the data_element, Sample_start is the amount of time relative to the trigger condition to start sampling, and Sample_end is the amount of time relative to the trigger condition to end sampling.

When data is captured, the parameter, parameter name, and a local time stamp are captured for each sample of data captured. The counterpart to this capability is the central maintenance facility that dynamically monitors and sources the appropriate "deeper dive" diagnostics. This facility could be configured to automatically send particular "deeper dive" diagnostic trigger and/or record specifications dependent upon reported faults. Human operations could also provide "deeper dive" trigger/record commands as well.

Embodiments combine a table/stack driven logic engine with the configurable trigger/ring buffer to enable the use of a powerful diagnostic remote support center 200 capable of pulling from a library of deep diagnostic logic/data capture modules to dynamically configure fielded systems for better diagnostic reporting without affecting core functionality of such systems. Embodiments provide improvement to the on-board diagnostic capability of aircraft without increasing the processing or memory requirements. Enhancements can be made dynamically during flight.

Embodiments can be applied to any application with an embedded controller where enhanced diagnostics are desired without changing the source code and are not limited to aircraft. Embodiments are particularly applicable to DO-178C certified systems such as those used in commercial aerospace, however.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

The methods and systems of the present disclosure, as described above and shown in the drawings, provide for remote data management with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A computer implemented method for managing data of a remote system, comprising:
   receiving, at a processor on the remote system, fundamental data from at least one of a monitored subsystem of the remote system or at least one associated subsystem of the remote system as specified by a diagnostic protocol for the monitored subsystem;
   wirelessly transmitting the fundamental data to a remote support center that is separate from the remote system;
   wirelessly receiving a signal from the remote support center including a diagnostic protocol change command;
   modifying the diagnostic protocol based on the diagnostic protocol change command to modify a content and/or a format of the fundamental data to output augmented data, and wherein modifying the diagnostic protocol includes modifying data output to at least include an associated subsystem relative to and associated with the monitored subsystem;
   receiving the augmented data from the monitored subsystem and/or the at least one associated subsystem and/or at least one other subsystem of the remote system; and
   transmitting the augmented data to the remote support center.

2. The method of claim 1, wherein modifying the diagnostic protocol includes modifying a stack/table logic that defines the diagnostic protocol.

3. The method of claim 1, wherein modifying the diagnostic protocol includes modifying a sample rate.

4. The method of claim 1, wherein modifying the diagnostic protocol includes modifying a sample time length.

5. The method of claim 1, wherein causing the output of augmented data includes modifying a data sample rate.

6. The method of claim 1, wherein the remote system is an aircraft.

7. The method of claim 6, wherein the remote support center is a ground based support center.

8. The method of claim 1, wherein the monitored subsystem is a hydraulic system and the associated system is electrical system.

9. A non-transitory computer readable medium including computer readable instructions for executing a method, the method comprising:
   receiving, at a processor on a remote system, fundamental data from a monitored subsystem of the remote system and/or at least one associated subsystem of the remote system as specified by a diagnostic protocol for the monitored subsystem;
   wirelessly transmitting the fundamental data to a remote support center that is separate from the remote system;
   wirelessly receiving a signal from the remote support center including a diagnostic protocol change command;
   modifying the diagnostic protocol based on the diagnostic protocol change command to modify the fundamental data to output augmented data, and wherein modifying the diagnostic protocol includes modifying data output to at least include an associated subsystem relative to and associated with the monitored subsystem;
   receiving the augmented data from the monitored subsystem and/or the at least one associated subsystem and/or at least one other subsystem of the remote system; and
   transmitting the augmented data to the remote support center.

10. The non-transitory computer readable medium of claim 9, wherein modifying the diagnostic protocol includes modifying a stack/table logic that defines the diagnostic protocol.

11. The non-transitory computer readable medium of claim 9, wherein modifying the diagnostic protocol includes modifying which subsystems of the remote system that data is output from with the fundamental data.

12. The non-transitory computer readable medium of claim 9, wherein modifying the diagnostic protocol includes modifying a sample rate.

13. The non-transitory computer readable medium of claim 9, wherein modifying the diagnostic protocol includes modifying a sample time length.

14. The non-transitory computer readable medium of claim 9, wherein causing the output of augmented data includes modifying a data sample rate.

15. The non-transitory computer readable medium of claim 9, wherein the remote system is an aircraft.

16. The non-transitory computer readable medium of claim 15, wherein the remote support center is a ground based support center.

17. A computer implemented method for managing data of a remote system, includes
   wirelessly receiving, at a processor of a remote data center and from the remote system, a fundamental data from a monitored subsystem of the remote system and/or at least one associated subsystem of the remote system as specified by a diagnostic protocol for the monitored subsystem;
   determining if a diagnostic protocol change is desired based upon the fundamental data received;
   wirelessly transmitting a signal from the remote data center including a diagnostic protocol change command;

wherein the diagnostic protocol change includes modifying the diagnostic protocol by switching data output to at least include the associated subsystem.

18. The method of claim 17, further comprising receiving, from the remote system, augmented data from the monitored subsystem and/or the at least one associated subsystem and/or at least one other subsystem of the remote system.

19. The method of claim 18, further comprising utilizing non-certified software to process the fundamental data and/or the augmented data.

\* \* \* \* \*